(12) United States Patent
Mahoney et al.

(10) Patent No.: US 8,256,222 B2
(45) Date of Patent: Sep. 4, 2012

(54) DIRECT METERING FUEL CONTROL WITH INTEGRAL ELECTRICAL METERING PUMP AND ACTUATOR SERVO PUMP

(75) Inventors: Timothy D. Mahoney, Chandler, AZ (US); Larry A. Portolese, Granger, AZ (US)

(73) Assignee: Honeywell International Inc., Morristown, NJ (US)

( * ) Notice: Subject to any disclaimer, the term of this patent is extended or adjusted under 35 U.S.C. 154(b) by 1373 days.

(21) Appl. No.: 12/029,058

(22) Filed: Feb. 11, 2008

(65) Prior Publication Data
US 2009/0199823 A1   Aug. 13, 2009

(51) Int. Cl.
*F02C 7/236* (2006.01)
*F02C 9/26* (2006.01)

(52) U.S. Cl. .......... 60/734; 60/740; 60/739; 60/39.281; 123/495; 123/497; 417/286; 417/287; 417/423.5

(58) Field of Classification Search .................. 60/734, 60/740, 736, 739, 39.281; 123/497, 495, 123/510; 417/423.5, 286, 287, 428
See application file for complete search history.

(56) References Cited

U.S. PATENT DOCUMENTS

| | | | | |
|---|---|---|---|---|
| 4,787,822 A | * | 11/1988 | Bennett | 417/2 |
| 5,118,258 A | * | 6/1992 | Martin | 417/3 |
| 5,245,819 A | * | 9/1993 | Kast | 60/734 |
| 6,126,401 A | | 10/2000 | Latham | |
| 6,651,441 B2 | * | 11/2003 | Reuter et al. | 60/772 |
| 6,935,480 B2 | | 8/2005 | Ziemer | |
| 6,971,373 B2 | * | 12/2005 | Mudway et al. | 123/497 |
| 7,291,082 B2 | | 11/2007 | Tiesler | |

* cited by examiner

*Primary Examiner* — Ehud Gartenberg
*Assistant Examiner* — Steven Sutherland
(74) *Attorney, Agent, or Firm* — Ingrassia Fisher & Lorenz, P.C.

(57) ABSTRACT

A fuel supply system includes a fuel metering pump and a servo-flow pump that are used to supply fuel to one or more fuel manifolds and one or more fluid-operated actuators, respectively. The fuel metering pump and the servo-flow pump are driven by the same electric motor(s).

20 Claims, 3 Drawing Sheets

US 8,256,222 B2

DIRECT METERING FUEL CONTROL WITH INTEGRAL ELECTRICAL METERING PUMP AND ACTUATOR SERVO PUMP

TECHNICAL FIELD

The present invention relates to gas turbine engine direct metering fuel control and, more particularly, to a system and method of providing both burn flow and actuator flow using integral pumps.

BACKGROUND

Many gas turbine engine fuel supply systems include a fuel source, such as a fuel tank, and one or more pumps that draw fuel from the fuel source and deliver pressurized fuel to the fuel manifolds in the engine combustor via a main supply line. The main supply line may include one or more valves in flow-series between the pumps and the fuel manifolds. These valves generally include, for example, a main metering valve and a pressurizing-and-shutoff valve downstream of the main metering valve. In addition to the main supply line, many fuel supply systems also include a bypass flow line connected upstream of the metering valve that bypasses a portion of the fuel flowing in the main supply line back to the inlet of the one or more pumps, via a bypass valve. The position of the bypass valve is typically controlled by a head regulation scheme to maintain a substantially fixed differential pressure across the main metering valve.

The above-described fuel supply system is generally safe, reliable, and robust. Nonetheless, it can suffer certain drawbacks. For example, the metering valve and bypass valve can add to overall system weight and complexity. Moreover, control of the metering valve and bypass valve can result in increased system complexity and cost. Thus, in recent years there has been a desire to implement more direct metering fuel control systems. In such systems fuel flow rate is controlled by controlling, for example, the speed or the displacement of the fuel metering pump. Yet, efforts to implement direct fuel metering control systems have also been impeded by the certain drawbacks. For example, many gas turbine engines include one or more secondary fuel loads, such as one or more fluid-operated actuators. In many instances these actuators are driven by the fuel from the fuel supply system. Thus, actuator operation can cause a droop in the fuel supplied to the engine, and thus an undesirable engine speed droop. It is also postulated that such fuel supply variations to the engine could yield unpredictable, and potentially less controllable, engine transients.

The above-mentioned drawbacks may be addressed by including an independently driven servo pump to supply adequate flow and pressure to the secondary fuel loads. This solution, however, exhibits its own drawbacks. In particular, the independent servo pump and its associated drive mechanism (e.g., a motor) and control mechanism (e.g., controller) increase overall system weight and costs. Yet another solution, which is disclosed in U.S. patent application Ser. No. 11/706,910, and which is assigned to the assignee of the instant invention, is to implement a software compensation algorithm in the fuel metering pump controller to compensate fuel metering pump speed to supply adequate flow and pressure to the secondary fuel loads. This solution also exhibits drawbacks in that it may rely on the use of a pressurizing valve, and the number of secondary loads that may be compensated for may be limited.

Hence, there is a need for a system and method of supply adequate fuel flow to secondary fuel loads in a direct metering fuel control system that does not increase overall system weight and costs and/or that is not limited in the number of secondary loads for which compensation may be provided. The present invention addresses one or more of these needs.

BRIEF SUMMARY

In one embodiment, and by way of example only, a fuel supply system includes an electric motor, a fuel metering pump, a servo-flow pump, and a controller. The electric motor is adapted to receive electrical current and is configured, upon receipt of the electrical current, to supply a drive force. The fuel metering pump is coupled to the electric motor to receive the drive force supplied therefrom, and is responsive to the drive force to supply fuel. The servo-flow pump is coupled to the electric motor to receive the drive force supplied therefrom, and is responsive to the drive force to supply fuel. The controller is adapted to receive one or more signals representative of a desired fuel flow rate and is operable, in response thereto, to control the electrical current supplied to the electric motor such that the drive force supplied by the electric motor causes the fuel metering pump to supply fuel at the desired fuel flow rate.

In another exemplary embodiment, a gas turbine engine system includes a gas turbine engine, a fluid-operated actuator, an electric motor, a fuel metering pump, a servo-flow pump, and a controller. The gas turbine engine includes one or more fuel manifolds. The electric motor is adapted to receive electrical current and is configured, upon receipt of the electrical current, to supply a drive force. The fuel metering pump is coupled to the electric motor to receive the drive force supplied therefrom, and is responsive to the drive force to supply fuel to the one or more fuel manifolds. The servo-flow pump is coupled to the electric motor to receive the drive force supplied therefrom, and is responsive to the drive force to supply fuel to the fluid-operated actuator. The controller is adapted to receive one or more signals representative of a desired fuel flow rate and is operable, in response thereto, to control the electrical current supplied to the electric motor such that the drive force supplied by the electric motor causes the fuel metering pump to supply fuel at the desired fuel flow rate to the one or more fuel manifolds.

In yet another exemplary embodiment, a gas turbine engine system includes a fuel source, a supply line, a gas turbine engine, a fluid-operated actuator, an electric motor, a fuel metering pump, a burn flow line, a servo-flow pump, a servo-flow line, and a controller. The supply line is in fluid communication with the fuel source. The gas turbine engine includes one or more fuel manifolds. The electric motor is adapted to receive electrical current and is configured, upon receipt of the electrical current, to supply a drive force. The fuel metering pump is coupled to the electric motor to receive the drive force supplied therefrom. The fuel metering pump is also in fluid communication with the supply line and is responsive to the drive force to supply fuel from the fuel source to the one or more fuel manifolds. The burn flow line is disposed between the fuel metering pump and the one or more fuel manifolds. The servo-flow pump is coupled to the electric motor to receive the drive force supplied therefrom. The servo-flow pump is also in fluid communication with the supply line and is responsive to the drive force to supply fuel from the fuel source to the fluid-operated actuator. The servo flow line is disposed between the servo-flow pump and the fluid-operated actuator. The controller is adapted to receive one or more signals representative of a desired fuel flow rate and is operable, in response thereto, to control the electrical current supplied to the electric motor such that the drive force supplied by the electric motor causes the fuel metering pump to supply fuel at the desired fuel flow rate to the one or more fuel manifolds.

Other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
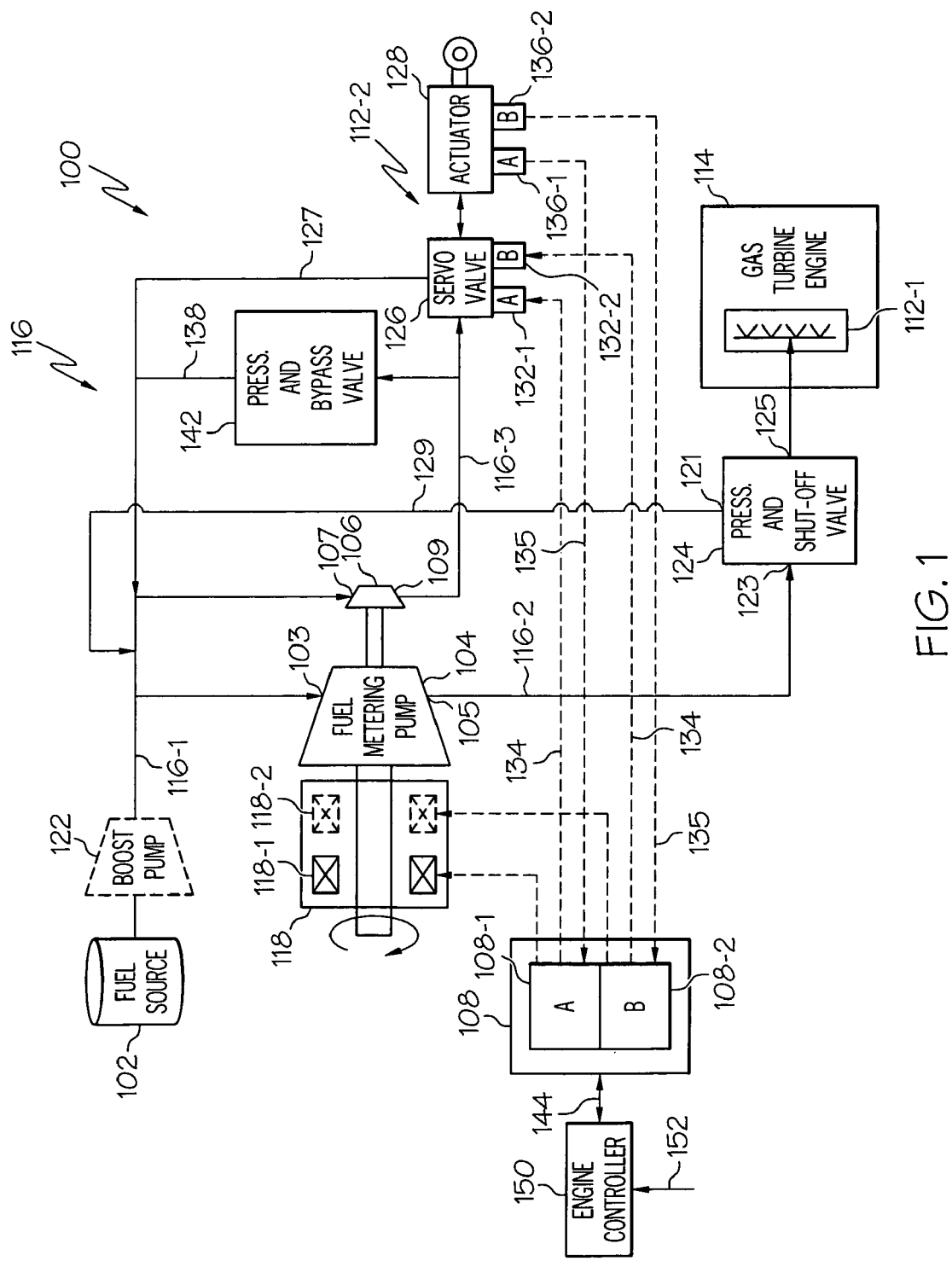
FIG. 1 is a block diagram of a direct metering fuel control system for a gas turbine engine according to one exemplary embodiment of the present invention.

A direct metering fuel control system for a gas turbine engine, such as a turbofan jet aircraft engine, according to one exemplary embodiment, is depicted in FIG. 1. The system 100 includes a fuel source 102, a fuel metering pump 104, a servo-flow pump 106, and a controller 108. The fuel source 102, which is preferably implemented as one or more tanks, stores fuel that is to be supplied to a plurality of fuel loads 112 (e.g. 112-1, 112-2). It will be appreciated that the number and type of fuel loads 112 may vary. In the depicted embodiment, however, the fuel loads 112 include one or more gas turbine engine fuel manifolds 112-1, and a fluid-operated actuator 112-2. The one or more gas turbine engine fuel manifolds 112-1, as may be readily understood, are preferably disposed within the combustor zone of a gas turbine engine 114.

A fuel distribution line 116 is coupled to the fuel source 102 and, via various components, delivers the fuel to the fuel loads 112. It is noted that the fuel distribution line 116 is, for convenience, depicted and described as including a supply line 116-1, a burn flow line 106-2, and a servo flow line 116-3. The supply line 116-1 delivers fuel drawn from the fuel source 102 to both the fuel metering pump 104 and the servo-flow pump 106. The burn flow line 116-2 delivers fuel from the fuel metering pump 104 to the one or more gas turbine engine fuel manifolds 112-1, and the servo flow line 116-3 delivers fuel from the servo-flow pump 106 to the fluid-operated actuator 112-2.

The fuel metering pump 104 is positioned in the fuel distribution line 116 and includes a fuel inlet 103 and a fuel outlet 105. In the depicted embodiment, the fuel metering pump 104 is a positive displacement pump such as, for example, a variable displacement piston pump. It will be appreciated, however, that this is merely exemplary, and that it could be implemented using any one of numerous other types of pumps. No matter its specific implementation, the fuel metering pump 104 is coupled to receive a drive torque from an electric motor 118 and, upon receipt of the drive torque, draws fuel from the supply line 116-1 into the fuel inlet 103 and discharges the fuel, at a relatively high pump discharge pressure out the fuel outlet 105 and into the burn flow line 116-2 for delivery to the one or more gas turbine engine fuel manifolds 112-1.

The servo-flow pump 106 is also positioned in the fuel distribution line 116, and includes a fuel inlet 107 and a fuel outlet 109. The servo-flow pump 106 draws fuel from the supply line 116-1 into its fuel inlet 107 and discharges the fuel, also at a relatively high pressure, via its fuel outlet 107, to the servo flow line 116-2. The servo-flow pump 106 is also coupled to, and receives the drive torque supplied by, the electric motor 118. For example, the fuel metering pump 104 and the servo-flow pump 106 may be mounted on the same shaft. The servo-flow pump 106 is preferably a high pressure pump and is responsive to the drive torque supplied from the electric motor 118 to draw fuel into its fuel inlet 107 and discharge the fuel from its fuel outlet 109 for supply to the servo flow line 116-2. In the depicted embodiment, the servo-flow pump 106 is implemented using a fixed-displacement piston pump. However, as will be described further below, the servo-flow pump 106 may be implemented using various other pumps including, for example, a centrifugal pump.

The electric motor 118 is adapted to be energized with electrical current and, upon being energized, generates and supplies the drive torque to the fuel metering pump 104 and the servo-flow pump 106. It will be appreciated that the electric motor 118 is preferably a brushless motor, though it will be appreciated that the electric motor 118 could be implemented using any one of numerous types of AC or DC motors. Moreover, as FIG. 1 further depicts in phantom, more than one electric motor 118 could be used to supply drive torque to the fuel metering pump 104 and the servo-flow pump 106. If more than one electric motor 118 is included, it will be appreciated that, for example, one motor 118-1 may be the primary motor and the other motor 118-2 may be a backup motor.

The depicted system 100 further includes a booster pump 122, such as a relatively low horsepower centrifugal pump. The booster pump 122, if included, is positioned in the supply line 116-1 and draws fuel from the fuel source 102 and provides sufficient suction head for the fuel metering pump 104 and the servo-flow pump 106. It will additionally be appreciated that the booster pump 122 may be either mechanically driven by the engine 114, or electrically driven by a non-illustrated motor. Moreover, the booster pump 122 may, in some embodiments, not be included. Although not depicted, it will be appreciated that the system 100 may additionally include a low pressure pump within the fuel tank(s) 102 to supply fuel to the booster pump 122.

The depicted embodiment further includes a burn flow pressurizing valve 124. The burn flow pressurizing valve 124, which is sometimes referred to as a pressurizing-and-shutoff valve, is positioned in flow-series in the burn flow line 116-1 downstream of the fuel metering pump 104, and functions to ensure a minimum fluid pressure magnitude is in the burn flow line 116-1. The burn flow pressurizing valve 124 includes an inlet 123 that is in fluid communication with the fuel metering pump 104, an outlet 125 that is in fluid communication with the one or more gas turbine engine fuel manifolds 112-1, and a return port 121 that is in fluid communication with the supply line 116-1 via a return line 129. The burn flow pressurizing valve 124 is movable between a closed position and an open position. In the closed position the pressurizing valve inlet 123 is not in fluid communication with the pressurizing valve outlet 125, but is in fluid communication with the return port 121. Thus, fuel flow through the burn flow pressurizing valve 124 to the one or more gas turbine engine fuel manifolds 112-1 is prohibited, but the flow is ported back to the fuel supply line 116-1 upstream of the fuel metering pump 104. Conversely, when the burn flow pressurizing valve 124 is in the open position, the pressurizing valve inlet 123 is in fluid communication with the pressurizing valve fluid outlet 125, and fuel flow through the burn flow pressurizing valve 124 to the one or more gas turbine engine fuel manifolds 112-1 may occur. The burn flow pressurizing valve 124 is configured to move from its closed position to an open position when the fuel metering pump discharge pressure reaches a predetermined pressure, and is further configured to move to the closed position when the fuel metering pump discharge pressure falls below the predetermined pressure. It will be appreciated that the pressurizing function of the burn flow pressurizing valve 124 may not be included in some embodiments. However, the shut-off function of this valve 124 is preferably included in each embodiment.

The fluid-operated actuator 112-2 is disposed downstream of, and receives a flow of fuel from, the servo-flow pump 106. It will be appreciated that for clarity and ease of illustration only a single fluid-operated actuator 112-2 is depicted in FIG. 1. However, more than one fluid-operated actuator could be disposed downstream of the servo-flow pump 106. The depicted fluid-operated actuator 112-2, which is merely exemplary of any one of numerous types of fluid-operated actuators, includes a servo valve 126 and an actuator 128. The servo valve 126 is disposed between the servo-flow pump 106 and the actuator 128, and selectively controls the flow rate of fuel to the actuator 128. The actuator 128, in response to the supplied fuel, supplies an actuation drive force to one or more devices such as, for example, one or more non-illustrated valves or one or more guide vanes. The servo valve 126 includes a suitable actuation device 132 is configured to be responsive to actuator position commands 134, which are supplied thereto, at least in the depicted embodiment, from the controller 108. In particular, the actuation device 132, in response to the actuation position commands 134, positions the servo valve 126 to control the flow of fuel to the actuator 128. A portion of the fuel that flows through the servo valve 126 is returned to the supply line 116-1 via a servo valve return line 127.

As FIG. 1 also depicts, a position feedback signal 135 is supplied back to the controller 108 from, for example, a suitable actuator position sensor 136. As with the electric motor 118, it will be appreciated that the servo valve 126 and the actuator 128 could be implemented with more than one actuation device 132 and more than one actuator position sensor 136, respectively, to provide suitable redundancy. For example, in the depicted embodiment, the system 100 includes two actuation devices 132 (primary 132-1, backup 132-2) and two actuator position sensors 136 (primary 136-1, backup 136-2).

Figure 2:
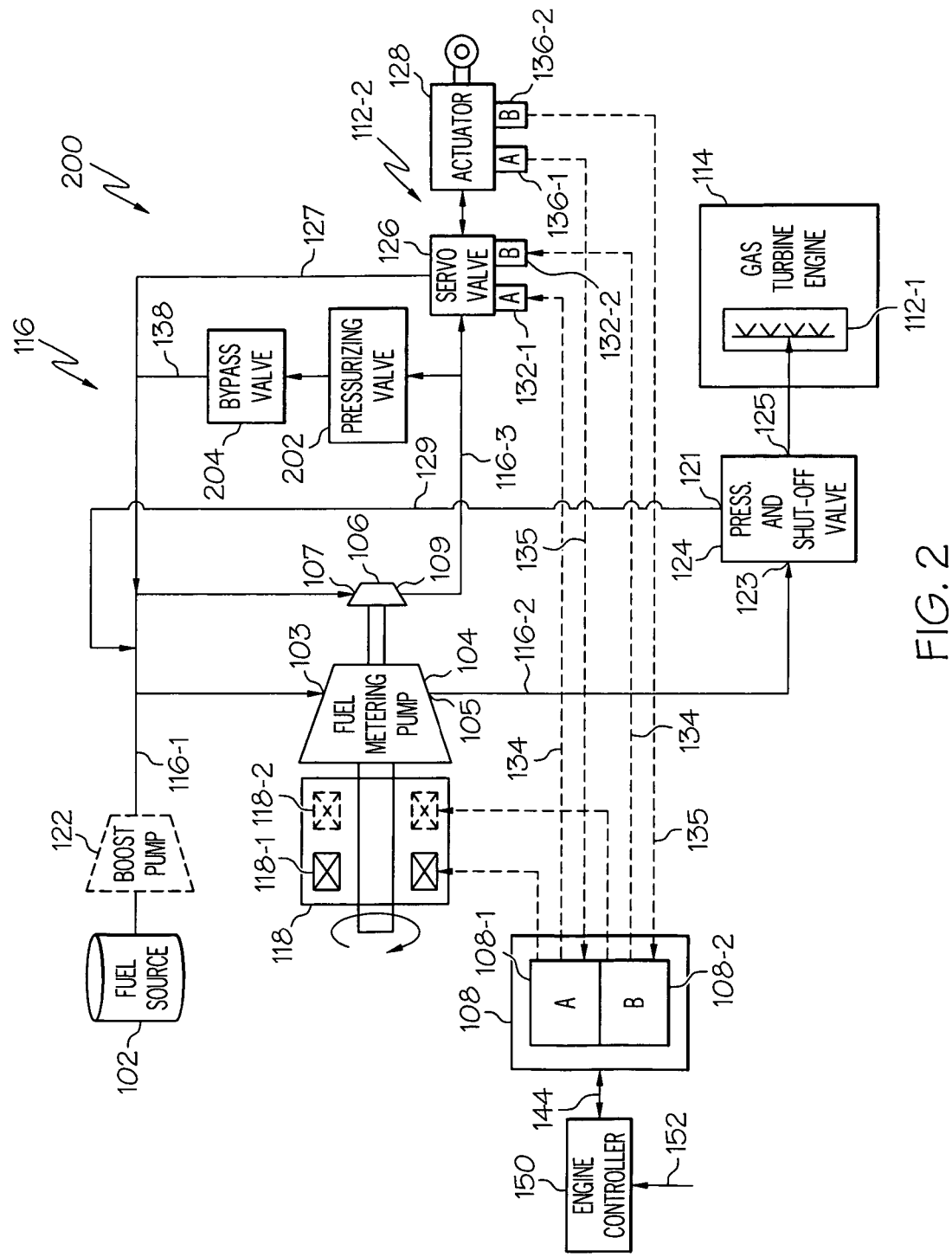
FIG. 2 is a block diagram of a direct metering fuel control system for a gas turbine engine according to an exemplary alternative embodiment of the present invention.

As was noted above, the servo-flow pump 106, at least in the depicted embodiment, is implemented using a positive displacement pump. Thus, the depicted system 100 further includes a bypass flow line 138 and a servo-flow pressurizing and bypass valve 142 mounted on the bypass flow line 138. The bypass flow line 138 is disposed between, and is in fluid communication with, the servo-flow pump inlet 107. The servo-flow pressurizing and bypass valve 142 functions to control fluid pressure in the servo-flow line 116-2 by bypassing, as needed, fuel that is discharged from the servo-flow pump 106 back to the servo-flow pump inlet 107. It will be appreciated that in an alternative embodiment the servo-flow pressurizing and bypass valve 142 may be implemented as multiple valves. For example, in the embodiment depicted in FIG. 2, the system is implemented with a pressurizing valve 202 and a bypass valve 204, both of which are mounted on the bypass flow line 138.

The controller 108 is configured to control the supply of electrical current to the electric motor 118, to thereby control the drive torque supplied to the fuel metering pump 104 and the servo-flow pump 106. Preferably, the controller 108 is adapted to receive one or more signals 144 representative of the drive torque needed to drive the fuel metering pump 104 at a speed to deliver a desired fuel flow rate to the one or more engine fuel manifolds 112-1. The motor controller 108, in response to the command signal 144, controls the current supplied to the electric motor 118 such that it generates the needed drive torque. It will be appreciated that in some embodiments, the system 100 could be implemented with more than one controller 108, or with a multi-channel controller 108, most notably in system embodiments that include more than one electric motor 118. For example, as FIG. 1 depicts in phantom, in system embodiments that include primary 118-1 and backup 118-2 electric motors, the controller 108 may be implemented with variously configured primary 108-1 and backup 108-2 channels.

The system 100, at least in the depicted embodiment, further includes an engine control 150. The engine control 150, which may be implemented as a Full Authority Digital Engine Controller (FADEC) or other electronic engine controller (EEC), controls the flow rate of fuel to the one or more fuel manifolds 112-1. To do so, the engine control 150 receives various input signals and controls the fuel flow rate to the one or more fuel manifolds 112-1 accordingly. In particular, the engine control 150 receives one or more signals 152 representative of a desired fuel flow to be delivered to the one or more engine fuel manifolds 112-1. The engine control 150, in response to the one or more signals 152, determines an appropriate motor speed command, and automatically generates the above-mentioned command signal 144 that is supplied to the controller 108. It will be appreciated that in some embodiments the controller 108 and the engine control 150 may be integrated together.

Figure 3:
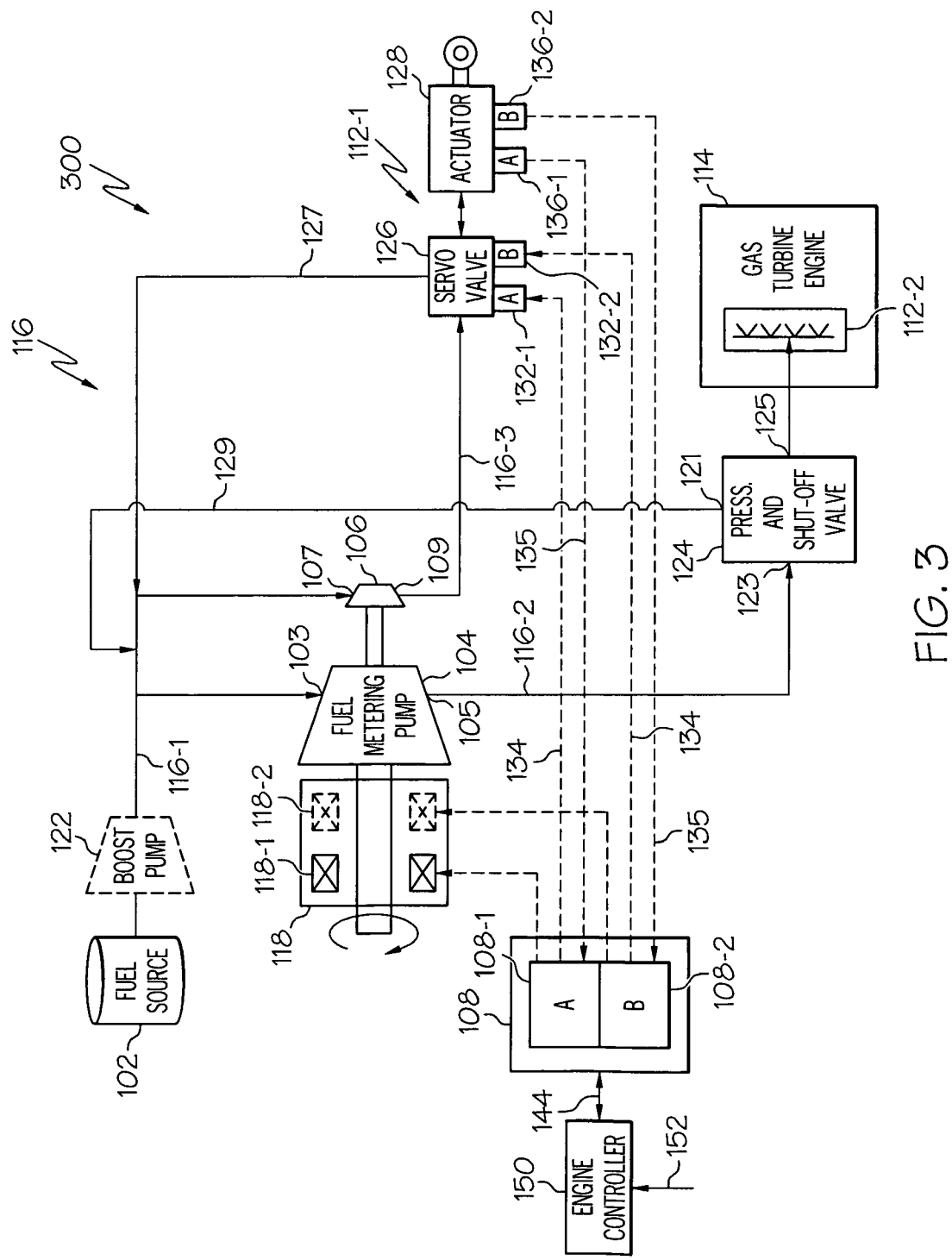
FIG. 3 is a block diagram of a direct metering fuel control system for a gas turbine engine according to yet another exemplary alternative embodiment of the present invention.

It was previously noted that the servo-flow pump 106 could, in some embodiments, be implemented as a centrifugal pump. If the servo-flow pump 106 is implemented as a centrifugal pump, the system may be implemented without the bypass flow line 138 and the servo-flow pressurizing and bypass valve 142 and/or the separate pressurizing valve 202 and bypass valve 204. Such an embodiment is depicted in FIG. 3, in which like reference numerals refer to like parts in FIG. 1.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine fuel supply system, comprising:
   an electric motor adapted to receive electrical current and configured, upon receipt of the electrical current, to supply a mechanical drive force;

a fuel metering pump mechanically coupled to the electric motor to receive the mechanical drive force supplied therefrom, the fuel metering pump responsive to the mechanical drive force to supply fuel;

a servo-flow pump mechanically coupled to the electric motor to receive the mechanical drive force supplied therefrom, the servo-flow pump responsive to the mechanical drive force to supply fuel; and a gas turbine controller adapted to receive one or more signals representative of a desired fuel flow rate and operable, in response thereto, to control the electrical current supplied to the electric motor such that the mechanical drive force supplied by the electric motor causes the fuel metering pump to supply fuel at the desired fuel flow rate.

2. The system of claim 1, further comprising:
a burn flow line coupled to receive fuel supplied by the fuel metering pump; and
a servo flow line coupled to receive fuel supplied by the servo-flow pump.

3. The system of claim 2, wherein the burn flow line is adapted to couple to one or more gas turbine engine fuel manifolds.

4. The system of claim 2, wherein the servo-flow pump comprises an inlet and an outlet, and wherein the system further comprises:
a bypass flow line in fluid communication between the servo flow line and the servo-flow pump inlet.

5. The system of claim 4, further comprising a pressurizing valve mounted on the bypass flow line.

6. The system of claim 4, further comprising a pressurizing and bypass valve mounted on the bypass flow line.

7. The system of claim 2, further comprising:
a fluid-operated actuator in fluid communication with the servo flow line to receive the fuel supplied from the servo-flow pump.

8. The system of claim 7, wherein the fluid-operated actuator comprises:
an actuator coupled to selectively receive fuel and operable, upon receipt thereof, to supply an actuation drive force; and
a servo valve coupled to receive fuel supplied by the servo-flow pump, the servo valve adapted to receive an actuator control command and operable, upon receipt thereof, to selectively supply the received fuel to the actuator.

9. The system of claim 2, wherein the servo-flow pump comprises a centrifugal pump.

10. The system of claim 1, wherein the electric motor is a primary electric motor, and wherein the system further comprises:
a backup electric motor coupled to the fuel metering pump and adapted to receive electrical current, the backup electric motor configured, upon receipt of the electrical current, to supply a mechanical drive force to the fuel metering pump.

11. The system of claim 10, wherein:
the controller comprises a primary channel and a backup channel;
the primary channel is operable to control the electrical current supplied to the primary electric motor; and
the backup channel is operable to control the electrical current supplied to the backup electric motor.

12. A gas turbine engine system, comprising:
a gas turbine engine including one or more fuel manifolds;
a fluid-operated actuator;
an electric motor adapted to receive electrical current and configured, upon receipt of the electrical current, to supply a mechanical drive force;

a fuel metering pump mechanically coupled to the electric motor to receive the mechanical drive force supplied therefrom, the fuel metering pump responsive to the mechanical drive force to supply fuel to the one or more fuel manifolds;

a servo-flow pump mechanically coupled to the electric motor to receive the mechanical drive force supplied therefrom, the servo-flow pump responsive to the mechanical drive force to supply fuel to the fluid-operated actuator; and a gas turbine controller adapted to receive one or more signals representative of a desired fuel flow rate and operable, in response thereto, to control the electrical current supplied to the electric motor such that the mechanical drive force supplied by the electric motor causes the fuel metering pump to supply fuel at the desired fuel flow rate to the one or more fuel manifolds.

13. The system of claim 12, further comprising:
a burn flow line disposed between the fuel metering pump and the one or more fuel manifolds; and
a servo flow line disposed between the servo-flow pump and the fluid-operated actuator.

14. The system of claim 13, wherein the servo-flow pump comprises an inlet and an outlet, and wherein the system further comprises:
a bypass flow line in fluid communication between the servo flow line and the servo-flow pump inlet; and
a pressurizing and bypass valve mounted on the bypass flow line.

15. The system of claim 13, wherein the servo-flow pump comprises an inlet and an outlet, and wherein the system further comprises:
a bypass flow line in fluid communication between the servo flow line and the servo-flow pump inlet;
a pressurizing valve mounted on the bypass flow line; and
a bypass valve mounted on the bypass flow line in series with the pressurizing valve.

16. The system of claim 12, wherein the fluid-operated actuator comprises:
an actuator coupled to selectively receive fuel and operable, upon receipt thereof, to supply an actuation drive force; and
a servo valve coupled to receive fuel supplied by the servo-flow pump, the servo valve adapted to receive an actuator control command and operable, upon receipt thereof, to selectively supply the received fuel to the actuator.

17. The system of claim 12, wherein the servo-flow pump comprises a centrifugal pump.

18. The system of claim 12, wherein the electric motor is a primary electric motor, and wherein the system further comprises:
a backup electric motor coupled to the fuel metering pump and adapted to receive electrical current, the backup electric motor configured, upon receipt of the electrical current, to supply a mechanical drive force to the fuel metering pump.

19. The system of claim 18, wherein:
the controller comprises a primary channel and a backup channel;
the primary channel is operable to control the electrical current supplied to the primary electric motor; and
the backup channel is operable to control the electrical current supplied to the backup electric motor.

20. A gas turbine engine system, comprising:
a fuel source;
a supply line in fluid communication with the fuel source;
a gas turbine engine including one or more fuel manifolds;
a fluid-operated actuator;
an electric motor adapted to receive electrical current and configured, upon receipt of the electrical current, to supply a mechanical drive force;
a fuel metering pump mechanically coupled to the electric motor to receive the mechanical drive force supplied therefrom, the fuel metering pump in fluid communication with the supply line and responsive to the mechanical drive force to supply fuel from the fuel source to the one or more fuel manifolds;
a burn flow line disposed between the fuel metering pump and the one or more fuel manifolds;
a servo-flow pump mechanically coupled to the electric motor to receive the mechanical drive force supplied therefrom, the servo-flow pump in fluid communication with the supply line and responsive to the mechanical drive force to supply fuel from the fuel source to the fluid-operated actuator;
a servo flow line disposed between the servo-flow pump and the fluid-operated actuator; and
a gas turbine controller adapted to receive one or more signals representative of a desired fuel flow rate and operable, in response thereto, to control the electrical current supplied to the electric motor such that the mechanical drive force supplied by the electric motor causes the fuel metering pump to supply fuel at the desired fuel flow rate to the one or more fuel manifolds.

* * * * *